106. COMPOSITIONS, COATING OR PLASTIC.

90

Patented Dec. 17, 1940

2,225,148

UNITED STATES PATENT OFFICE 2,225,148

PLASTIC PORTLAND CEMENT

Ira C. Bechtold, Colton, Calif., assignor to California Portland Cement Company, Los Angeles, Calif., a corporation of California No Drawing. Application March 18, 1938,
Serial No. 196,700

14 Claims. (Cl. 106—27)

This invention has to do generally with Portland cements, and in some of its more specific aspects, relates to improved plastic Portland cements and their methods of manufacture.

The invention is primarily concerned with the use, in Portland cement manufacture, of diglycol laurate, that includes a mixture of the following chemical ingredients; namely, diethylene glycol monolaurate and diethylene glycol dilaurate, the formulae of which are:

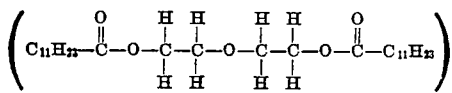
(dilaurate)

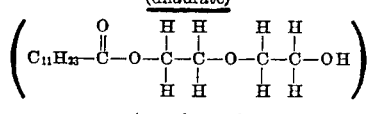
(monolaurate)

which I have discovered to have certain marked effects in facilitating the grinding of cement clinker and improving the properties of the ground cement. As contemplated by the invention, diglycol laurate may be used as an admixture or grinding aid in the manufacture of Portland cements in general, since it has been found to aid grinding of Portland cement clinkers or clinker containing mixtures, of various compositions. The general effects of grinding aids, as such, are known in the art and require no extensive explanation. It will suffice to state that when interground in small proportions with Portland cement clinker, some substances have been observed to facilitate grinding of the clinker, and to reduce the amount of energy required to grind the clinker to given fineness, particularly where grinding is carried to high finenesses. The effectiveness of grinding aids apparently is due to their action as dispersing agents, tending to free or disperse into the clinker being ground, fine clinker particles that otherwise build up in layers on the grinding media wall of the mill and thereby prevent direct interaction between the grinding surfaces. Diglycol laurate has been found to possess exceptional effectiveness as a grinding aid, and to be superior in this respect, among others, to substances used in the past for that purpose.

In addition, however, diglycol laurate has been found to improve in certain important respects the properties of the finished cement, this being particularly true with respect to plastic Portland cements. Such cements, interground with diglycol laurate, are decidedly more plastic and workable than the ordinary plastic Portland cements, and in other respects their properties are influenced by the presence of the diglycol laurate to give them superior qualities as plastic cements. In the manufacture of ordinary Portland cements, I may intergrind a suitable proportion of the diglycol laurate with Portland cement clinker containing gypsum or other substances adapted to control the setting or hardening properties of the cement. In making plastic cements of the type contemplated by the invention, diglycol laurate is interground with Portland cement clinker containing a material adapted to increase the plasticity and workability of the finished cement. The use of diglycol laurate in making these plastic cements, facilitates grinding to fine particle size and also improves the plastic properties of the cement beyond, or independently of, greater plasticity resulting from increased fineness alone.

In making plastic cements, the diglycol laurate may be interground with Portland cement clinker containing a suitable material adapted to give greater plasticity to the finished cement. I prefer to use one, or a mixture, of two general types of materials, the effect of which when ground with the cement clinker and diglycol laurate, is to promote formation of a particle size distribution and increased specific surface which enhance the plastic properties of the finished cement. One type of such materials may be classed as chemically inert substances, of which natural sand may be cited as typical. For example, a sand relatively rich in free quartz, such as would be the result of the weathering of granitic rocks can be used to advantage. The second type are active materials in the sense that they are reactive with lime released in the cement during hydration. Pouzzolanic materials, for example shales of marine origin which occur in Southern California, may be cited as illustrative of the second (lime reactive) type. Shales of this type occur as marine sediments of Miocene Age in the Upper Puente of Southern California. These shales are characterized by their pronounced pouzzolanic activity. The pouzzolan, like sand, has the effect of aiding in developing a product of a particular size distribution and specific surface especially desirable for plastic cement, and it has the additional property, by reason of its capacity for reaction with lime released from the cement during hydration, of increasing the strength obtained in mortars at late ages. For this reason, and also because in many instances the pouzzolan will improve the plastic properties of the cement to a greater degree than the inert material, the pouzzolan generally is to be preferred.

The improved properties of both normal and plastic Portland cements interground with diglycol laurate, are illustrated in the table below. Referring to the table, samples A and B were cements prepared from the same Portland cement clinker stock and differing in composition only by sample B being interground with a small percentage of diglycol laurate. Both samples were subjected to grinding under the same conditions so that their differences in fineness are due solely to the presence of the grinding aid. Sample B will be seen to have a substantially larger proportion of particle sizes within the 0–20 micron range, and to have a specific surface greater than that of sample A by over 300. These values of course indicate the marked influence of the diglycol laurate as a grinding aid, and the economies to be effected by its use, particularly in grinding to high finenesses. Sample B also shows superiority in the autoclave expansion test, and otherwise satisfactory properties.

The plastic cements, samples D and E, were prepared by intergrinding normal Portland cement clinker, gypsum and diglycol laurate with sand and pouzzolan, respectively. For purposes of comparison, the table shows the corresponding properties of an ordinary Portland cement, sample C (prepared from a stock different from sample A), lacking the diglycol laurate and added material, and made from the same clinker stock used in the preparation of samples D and E. The total amounts (weights) of samples C, D and E were the same, and the same amount of energy was used in the grinding of each. It will be noted that cement D and E have considerably greater finenesses than the control sample C, and that the effect of the pouzzolan in sample E is to substantially increase the fineness beyond that of sample D interground with sand. Autoclave expansions for cements D and E are substantially lower than the corresponding value of the control sample. Although the setting times are somewhat longer for cements D and E, this is desirable for most work in which plastic cements are used. The strengths at all periods are satisfactory for plastic cements.

Cement F is an ordinary commercial plastic Portland cement which is generally regarded as having good workability and plastic properties. In comparison, cements D and E are found to be far superior to cement F in plastic properties, as demonstrated by workability tests. Cements D and E have these superior properties notwithstanding the fact that their finenesses are considerably below the fineness of cement F. This fact is of significance in that the present cements may be manufactured at considerable savings in grinding costs, and still surpass in their essential properties, more finely ground plastic cements of ordinary compositions.

While the table shows certain percentages of diglycol laurate, sand and pouzzolan to be used, these may be added in any suitable percentages productive of best results. Ordinarily the necessary amount of diglycol laurate will not exceed 0.50% by weight of the clinker mixture, and usually smaller percentages within the range of from 0.05 to 0.25% will suffice. Likewise, the amounts of sand or pouzzolan may vary, although their proportions normally will be under substantially 30%. The tabulated finenesses also are typical only, since the presence of diglycol laurate in suitable proportions is found to facilitate grinding to fineness levels below or well in excess of those given.

I claim:

1. The process that includes, grinding Portland cement clinker admixed with a small percentage of diglycol laurate to produce Portland cement in finely divided form.

2. The process that includes, grinding Portland cement clinker admixed with from substantially 0.05% to 0.50% by weight of diglycol laurate to produce Portland cement in finely divided form.

3. The process that includes, grinding Portland cement clinker admixed with a small percentage of diglycol laurate and a plasticizing material, to produce Portland cement in finely divided form.

4. The process that includes, grinding Portland cement clinker admixed with sand and a small percentage of diglycol laurate to produce Portland cement in finely divided form.

5. The process that includes, grinding Portland cement clinker admixed with a lime reactive plasticizing material and a small percentage of diglycol laurate to produce Portland cement in finely divided form.

6. The process that includes, grinding Portland cement clinker admixed with pouzzolanic shale and a small percentage of diglycol laurate to produce Portland cement in finely divided form.

7. The process that includes, grinding Portland cement clinker admixed with under substantially 30% by weight of a siliceous plasticizing material, and from substantially 0.05% to 0.50% by weight

| Cement sample | Composition | Percent-ages | Fineness | | Percent-ages net expansion in autoclave | Per-cent water for N. C. | Setting time | | | | Std. 1:3 tensile strength | | |
|---|---|---|---|---|---|---|---|---|---|---|---|---|---|
| | | | 0/0–20 microns | Specific surface | | | Initial | | Final | | | | |
| | | | | | | | Hours | Minutes | Hours | Minutes | 1D | 7D | 28D |
| A | Clinker<br>Gypsum | 96.14<br>3.86 | 54.8 | 1941 | −0.568 | 24.0 | 2 | 10 | 4 | 20 | | | |
| B | Clinker<br>Gypsum<br>Diglycol laurate | 96.04<br>3.86<br>0.10 | 66.9 | 2278 | −0.476 | 28.5 | 2 | 30 | 5 | 22 | | | |
| C | Clinker<br>Gypsum | 96.14<br>3.86 | 54.8 | 1953 | −0.490 | 23.5 | 2 | 46 | 5 | 15 | 153 | 391 | 441 |
| D | Clinker<br>Gypsum<br>Sand<br>Diglycol laurate | 87.0<br>3.2<br>9.7<br>0.10 | 62.5 | 2150 | −0.268 | 28.5 | 3 | 21 | 6 | 15 | 127 | 301 | 358 |
| E | Clinker<br>Gypsum<br>Pouzzolan<br>Diglycol laurate | 87.0<br>3.2<br>9.7<br>0.10 | 61.7 | 2288 | −0.040 | 29.0 | 2 | 56 | 6 | 05 | 119 | 309 | 426 |
| F | Typical commercial plastic cement | | 64.9 | 2545 | | 26.9 | 3 | 01 | 5 | 49 | | 295 | 323 | of diglycol laurate to produce Portland cement in finely divided form.

8. The process that includes, grinding Portland cement clinker admixed with under substantially 30% by weight of pouzzolanic shale, and from substantially 0.05% to 0.50% by weight of diglycol laurate to produce Portland cement in finely divided form.

9. Portland cement in dry finely divided form containing a small percentage of diglycol laurate uniformly distributed throughout the cement and coating the individual particles thereof.

10. Portland cement in dry finely divided form containing substantially 0.05% to 0.50% by weight of diglycol laurate uniformly distributed throughout the cement and coating the individual particles thereof.

11. Portland cement in dry finely divided form containing a small percentage of diglycol laurate and a material adapted to increase the plasticity of the cement, said diglycol laurate being uniformly distributed throughout the cement and coating the individual particles thereof.

12. Portland cement in dry finely divided form containing substantially 0.05% to 0.50% by weight of diglycol laurate and a material adapted to increase the plasticity of the cement, said diglycol laurate being uniformly distributed throughout the cement and coating the individual particles thereof.

13. Portland cement in dry finely divided form containing sand and a small percentage of diglycol laurate uniformly distributed throughout the cement and coating the individual particles thereof.

14. Portland cement in dry finely divided form containing a pouzzolanic shale reactive with lime, and a small percentage of diglycol laurate uniformly distributed throughout the cement and coating the individual particles thereof.

IRA C. BECHTOLD.